(12) United States Patent
Beutin et al.

(10) Patent No.: US 7,007,890 B2
(45) Date of Patent: Mar. 7, 2006

(54) TURBOJET DESIGNED TO BE FIXED ONTO THE AFT PART OF THE FUSELAGE OF AN AIRCRAFT, IN UPPER POSITION

(75) Inventors: Bruno Beutin, Evry (FR); Didier Yvon, Viry-Chatillon (FR); Georges Mazeaud, Yerres (FR); Fabien Burdin, Paris (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/986,004

(22) Filed: Nov. 12, 2004

(65) Prior Publication Data

US 2005/0178887 A1   Aug. 18, 2005

(30) Foreign Application Priority Data

Nov. 12, 2003   (FR) .................................. 03 13245

(51) Int. Cl.
*B64D 27/00* (2006.01)
(52) U.S. Cl. .................. 244/54; 60/226.1; 60/796; 248/555; 244/55
(58) Field of Classification Search ............... 244/54, 244/55, 53 R; 60/39.31, 226.1, 796, 797; 248/555, 556
See application file for complete search history.

(56) References Cited

U.S. PATENT DOCUMENTS

| | | | | |
|---|---|---|---|---|
| 2,863,620 A | * | 12/1958 | Vautier | 244/15 |
| 3,543,588 A | * | 12/1970 | Richardson | 74/15.8 |
| 3,714,779 A | * | 2/1973 | Stein et al. | 60/796 |
| 3,735,946 A | | 5/1973 | Mullins | |
| 3,809,340 A | | 5/1974 | Dolgy et al. | |
| 4,044,973 A | | 8/1977 | Moorehead | |
| 4,585,189 A | * | 4/1986 | Buxton | 244/54 |
| 5,443,229 A | | 8/1995 | O'Brien et al. | |
| 6,357,220 B1 | * | 3/2002 | Snyder et al. | 60/796 |
| 6,401,448 B1 | * | 6/2002 | Manteiga et al. | 60/226.1 |
| 2003/0102405 A1 | * | 6/2003 | McEvoy | 244/54 |

* cited by examiner

*Primary Examiner*—Galen Barefoot
(74) *Attorney, Agent, or Firm*—Oblon, Spivak, McClelland, Maier & Neustadt, P.C.

(57) ABSTRACT

The turbojet according to the invention is designed to be fixed onto the upper part of the aft section of the fuselage of an aircraft using at least one coat hanger, the turbojet comprising a fan, a forward casing, an aft casing, accessories arranged around the periphery of the forward casing, the forward casing comprising attachment points, for the coat hanger. The attachment points are arranged so that the turbojet can be installed indifferently on either side of the aircraft fuselage, accessories being arranged on the casing so that they are accessible from the outside of the fuselage regardless of which side the installation is done.

9 Claims, 2 Drawing Sheets

TURBOJET DESIGNED TO BE FIXED ONTO THE AFT PART OF THE FUSELAGE OF AN AIRCRAFT, IN UPPER POSITION

This invention relates to a turbojet designed to be fixed onto the aft part of the fuselage of an aircraft, in upper position on the fuselage.

Aircraft manufacturers are very concerned with noise problems, which are annoying for populations living close to airports. They would like to minimise noise emissions, mainly from the fan and nozzle of turbojets.

Document U.S. Pat. No. 6,199,795 proposes a turbojet assembly mounted in upper position on the fuselage near the aft part of an aircraft; noise from fans is partially reflected by the fuselage, while noise from nozzles is partially reflected either by the vertical or the horizontal stabilizer of the tail fin. Moreover, the forward section of the aircraft fuselage acts as a screen on the input side of the turbojets and limits the ingress of bodies that could damage them. Furthermore, the wings that do not support the turbojets are released from the loads applied to them, which has many aerodynamic advantages.

The problem of installation and attachment of the turbojets in this position arises. Document U.S. Pat. No. 4,044,973 describes an attachment device comprising a part usually called a "coat hanger" and fixed to an attachment beam on the fuselage, the coat hanger with its means of attachment to the turbojet being fixed onto the turbojet casing. Conventionally, each turbojet is fixed to the fuselage using two of the said devices, one at a forward casing and the other at an aft casing.

The two turbojets are fixed on each side of the fuselage, therefore through different portions around the periphery of their casing. There are also various devices necessary for operation of the turbojet around the periphery of each casing, and particularly the Accessory Gearbox (AGB), an oil tank, a computer and a fuel control unit. These devices will be referred to as accessories in the remainder of this description. One of these accessories is the accessory gearbox, which is a conventional device used in a turbojet and is in the form of a single box, comprising particularly generators for the turbojet and for the aircraft, fuel and oil pumps, a starter, and various accessories mechanically driven by the engine shaft through power take-off points.

Various problems arise for attachment of two turbojets onto the upper part of the aft fuselage of an aircraft.

A first problem is a manufacturing and production cost problem. Due to the arrangement of the turbojets on each side of the fuselage, the left and right turbojets are not identical since they are not fixed on the same side. Therefore, two production lines are necessary for manufacturing the turbojets. The various accessories can admittedly be located on the same side of the turbojets, in other words once the turbojets are installed, they are in different positions with respect to the fuselage, but other problems then arise.

Firstly, from the point of view of ground maintenance of aircraft, such a situation is unthinkable, since turbojet accessories must be accessible from the outside of the fuselage, through walkways or forklift trucks, without operators having to walk on the fuselage.

Then from a safety point of view, the various turbojet accessories must be placed such that if the disk of one of the rotors of one of the turbojets bursts, the splinters cannot reach the accessories of the other turbojet.

Turbojets designed to be placed laterally on the fuselage, as described in document U.S. Pat. No. 4,044,973, comprise an accessory gearbox on the bottom part of the turbojet. Their structure is arranged such that the attachment points of a coat hanger can be formed on each side of the turbojet, so that the turbojet can be installed on the right or left side of the aircraft fuselage indifferently. However in these turbojets, although the accessory gearbox is accessible regardless of which side of the aircraft the turbojet is mounted on, a number of other accessories and particularly harnesses, air inlets for the aircraft, a computer, an oil tank and a fuel control unit, are installed on the side on which the pod is opened, which requires a different arrangement for the two turbojets.

This invention is intended to offer a common solution to all these problems for a turbojet placed in upper position at the aft section of the fuselage of an aircraft.

To achieve this, the invention relates to a turbojet designed to be fixed in upper position of the aft section of the fuselage of an aircraft, using at least one coat hanger, the turbojet comprising a fan, a forward casing, an aft casing, accessories arranged around the periphery of the forward casing, the forward casing comprising coat hanger attachment points, characterised in that the attachment points are arranged so as to enable the turbojet to be assembled indifferently on either side of the fuselage, the accessories are arranged on the casing so that they are accessible from the outside of the fuselage regardless of which side the turbojet is mounted on, the coat hanger attachment points to the forward casing being distributed on each side of the vertical plane containing the centreline of the turbojet and the coat hanger being designed to be fixed offset from its attachment arm to the aircraft, the accessories being located close to the vertical plane and comprising at least one oil tank, a fuel control unit or a computer, placed on the upper part of the forward casing, and an accessory gearbox placed on the lower part of the forward casing.

The expression "from the outside of the aircraft fuselage" means from the right side of a turbojet if the turbojet is placed to the right of the fuselage, and from the left side of a turbojet if the turbojet is placed to the left of the fuselage. Left and right mean the sides used with reference to the direction of the airflow in the turbojet, in other words when facing the front of the aircraft.

According to the invention, the same turbojet may be fixed on either side of the fuselage of the aircraft, by fixing it to a coat hanger using attachment points located on one side or the other side of the vertical plane. Therefore, a simple translation movement is made between the two engines, the accessories remaining accessible from the outside of the fuselage due to their positioning. Only elements passing in the beam of the coat hanger, namely air inlet ducts for the aircraft, fuel transport pipes and some harnesses, are not in the same position on the turbojet; however, due to the fact that the turbojet is placed in upper position on the aircraft fuselage, their connection points to the corresponding devices on the turbojet can be located in the bottom part of the turbojet and therefore at the same location on each turbojet, unlike the solution given in document U.S. Pat. No. 4,044,973 where they were either at the right or at the left.

Because of the safety problem in case the disk of one of the rotors should burst, it was recommended that a configuration similar to that disclosed in document U.S. Pat. No. 4,044,973 should be used, either by placing turbojets in the side position on the aircraft fuselage to prevent them from facing each other directly, or by placing accessories other than the accessory gearbox on the side of the turbojet, on one side or the other depending on the side on which the turbojet is mounted. The invention avoids these constraints and enables, not only mounting the turbojets on the upper part of the fuselage, but also obtaining an identical turbojet regardless of whether it is mounted on the left or right side.

Advantageously, the aft casing also comprises coat hanger attachment points distributed on each side of the vertical plane.

In this case, the coat hangers for attachment to the aft casing are conventional, since nothing hinders their placement.

In the preferred embodiment of the turbojet according to the invention, the turbojet comprises a fan cowl that can be separated into two parts, one that hinges upwards and the other that hinges downwards to provide access to accessories on the side on which the turbojet is mounted.

In this case, the part that can hinge downwards is preferably hinged in two parts.

The invention also relates to an aircraft with a fuselage, two turbojets according to the invention fixed to each side of the fuselage in upper position using a coat hanger fixed on the forward casing and a coat hanger fixed on the aft casing.

The invention will be better understood after reading the following description of the preferred embodiment of the turbojet according to the invention, with reference to the attached drawing, on which:

Figure 1:
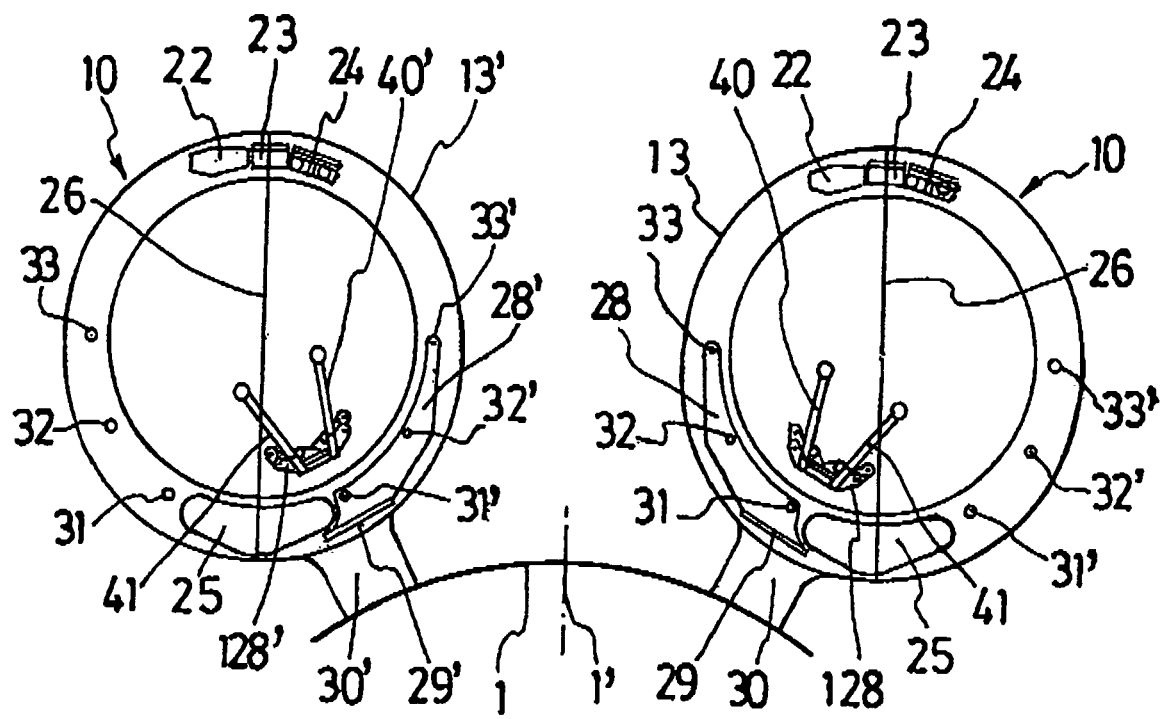
FIG. 1 shows a schematic front view of two turbojets according to the preferred embodiment of the invention, placed on the fuselage of an aircraft.
Figure 2:
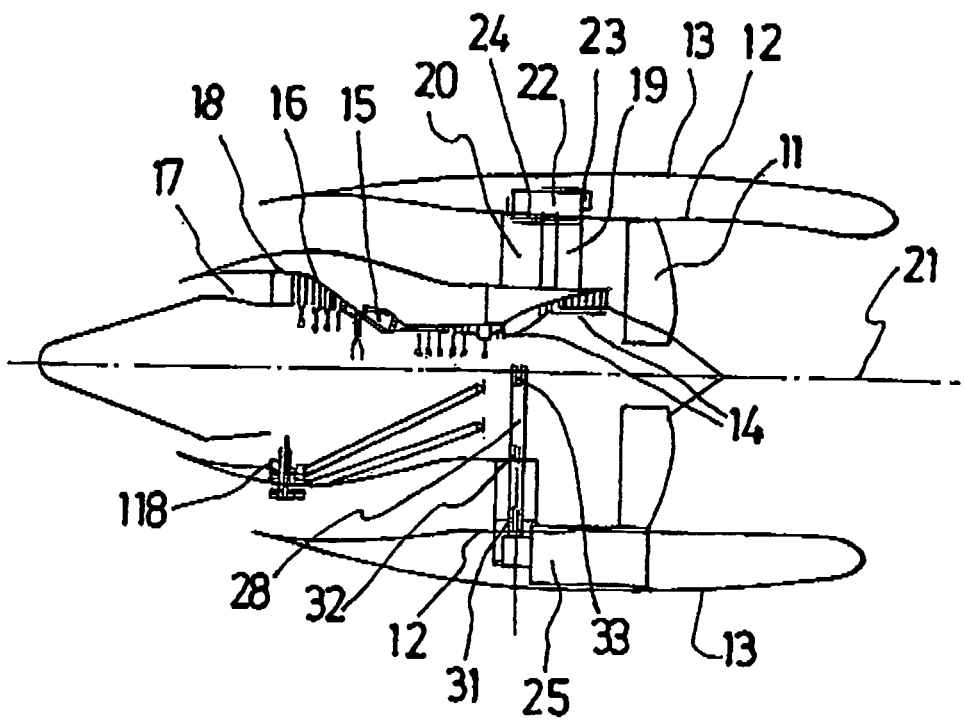
FIG. 2 shows a schematic left side view of the right turbojet of FIG. 1.

FIG. 1 shows two turbojets 10 installed on the aft section of the fuselage 1 of an aircraft, in upper position. FIG. 2 shows the right turbojet 10 of FIG. 1 seen from the left side view, the left and right being understood as the sides used with reference to the direction of the airflow in the turbojet, as defined in the preamble to this application. The downstream and upstream expressions will also be used with reference to this flow.

The turbojet 10 comprises a fan 11 surrounded by a forward casing 12, itself protected by a fan cowl 13, 13'. On the downstream side of the fan 11, the turbojet comprises a compressor 14, a combustion chamber 15, a turbine 16 and a nozzle 17, in sequence. An aft casing 18 held in place by anus is located on the downstream side of the turbine 16.

More precisely, the forward casing 12 is divided into a retention casing and an intermediate casing, the retention casing surrounding the fan 11 and the intermediate casing surrounding guide vanes 19 and support arms 20. However, the structure of the forward casing 12 will not be described in more detail, and in the remainder of the description we will simply refer to the forward casing 12 as a complete assembly.

At the periphery of the forward casing 12 there are accessories, namely in this case an oil tank 22, a fuel control unit 23, a computer 24 and an accessory gearbox 25.

The turbojet 10 is arranged along the direction of an axis 21. In the preferred embodiment of the turbojet 10 according to the invention, the oil tank 22, the fuel control unit 23 and the computer 24 are placed, from left to right in order, on the upper part of the forward casing 12, close to the vertical plane 26 containing the axis 21 of the turbojet 10, longitudinally at the location of the guide vanes 19. More precisely, they are placed so that they are as close as possible to the vertical plane 26, and arranged such that they have a minimum potential impact surface area if the disk of one of the rotors should burst in the facing turbojet, regardless of whether the turbojet 10 is on the right or left side of the aircraft fuselage.

The accessory gearbox 25 is located on the lower part of the forward casing 12, close to the vertical plane 26, longitudinally at the location of the guide vanes 19 in its downstream part. The accessory gearbox 25 comprises particularly generators for the turbojet and the aircraft, fuel and oil pumps, a starter, and various mechanically driven accessories driven by the turbojet shaft, using power takeoff points. Similarly, it is arranged so that it has a minimum impact surface area if the disk of one of the rotors in the facing turbojet bursts.

The forward casing 12 comprises attachment means for a coat hanger 28, 28'. Each coat hanger 28, 28' is in the form of a metallic part arranged so as to fit to a section of the casing 12 to be fixed to it, either on its right part (coat hanger 28'), or on its left part (coat hanger 28). Each coat hanger 28, 28' comprises an attachment plate 29, 29' to an arm, or beam, 30, 30', the arm 30, 30' being fixed to the fuselage 1 of the aircraft, either on its left side (arm 30'), or on its right side (arm 30).

The means of attachment of the coat hanger 28 to the casing 12 comprise attachment points 31, 32, 33, 31', 32', 33', well known according to prior art and that will not be described further herein, the detail of their structure not being unnecessary to the understanding of the invention. These attachment points 31, 32, 33, 31', 32', 33' are arranged on each side of the vertical plane 26, more precisely symmetrically about this vertical plane. Thus, three attachment points 31, 32, 33 are placed along a left portion of the forward casing 12, the other three attachment points 31', 32', 33' being placed along a right portion of the casing 12, symmetrically about the plane 26. The coat hanger 28 can thus be fixed on the left part of the casing 12, through attachment points 31, 32, 33, and the coat hanger 28' on the right part of the casing 12, using attachment points 31', 32', 33'.

The attachment points 31, 32, 33, 31', 32', 33', placed on each side of the vertical plane 26 are placed on each side of the accessory gearbox 25. Each coat hanger 28, 28' is fixed to the turbojet 10 offset, that is to say cantilevered, from its arm 30, 30' connecting it to the fuselage, in other words each coat hanger 28, 28' only extends on one side of this support arm 30, 30', the opposite side to the accessory gearbox 25. Indeed, this accessory gearbox extends in the same plane or a plane close to the plane of the coat hanger 28, 28' and does not permit to fix it at its location. Thus, the coat hanger 28 fixed to the right of the aircraft fuselage extends towards the left and upwards from its arm 30 connecting it to the aircraft fuselage, while the coat hanger 28' at the left extends to the right and upwards. In this case, each coat hanger 28, 28' is located adjacent to the accessory gearbox 25, on one side or the other.

The stresses on the attachment points 31, 32, 33, 31', 32', 33' are compression stresses, due to the fact that the turbojets 10 are placed in the upper position. These attachment points are arranged accordingly, and designed to take account of the cantilever effect of the coat hangers 28, 28'.

Due to the symmetrical placement of the attachment points 31, 32, 33, 31', 32', 33', the same turbojet 10 may be placed indifferently at the right or left of the aircraft fuselage 1. All that is necessary to achieve this is to fix it to the coat hanger 28, 28' using the ad hoc attachment points ((31, 32, 33), (31', 32', 33').

From the production point of view, this means that only one type of turbojet 10 needs to be constructed, that can be placed either on the left or right of the fuselage 1.

Concerning access to accessories of the turbojet 10, their placement close to the vertical plane 26, at the upper part of the turbojet 10 for the oil tank 22, the fuel control unit 23 and the computer 24, and at the bottom part of the turbojet 10 for the accessory gearbox 25, means that they can be indifferently accessible from the left or right of the turbojet 10. Their access will be less dependent on the placement of the turbojet 10 at the left or right, when they are closer to the plane 26.

The fan cowl 13, 13' is different depending on the placement of the turbojet 10. It is arranged on the turbojet 10 such that the accessories 22, 23, 24, 25 of the turbojet are accessible from the outside of the fuselage 1.

Figure 3:
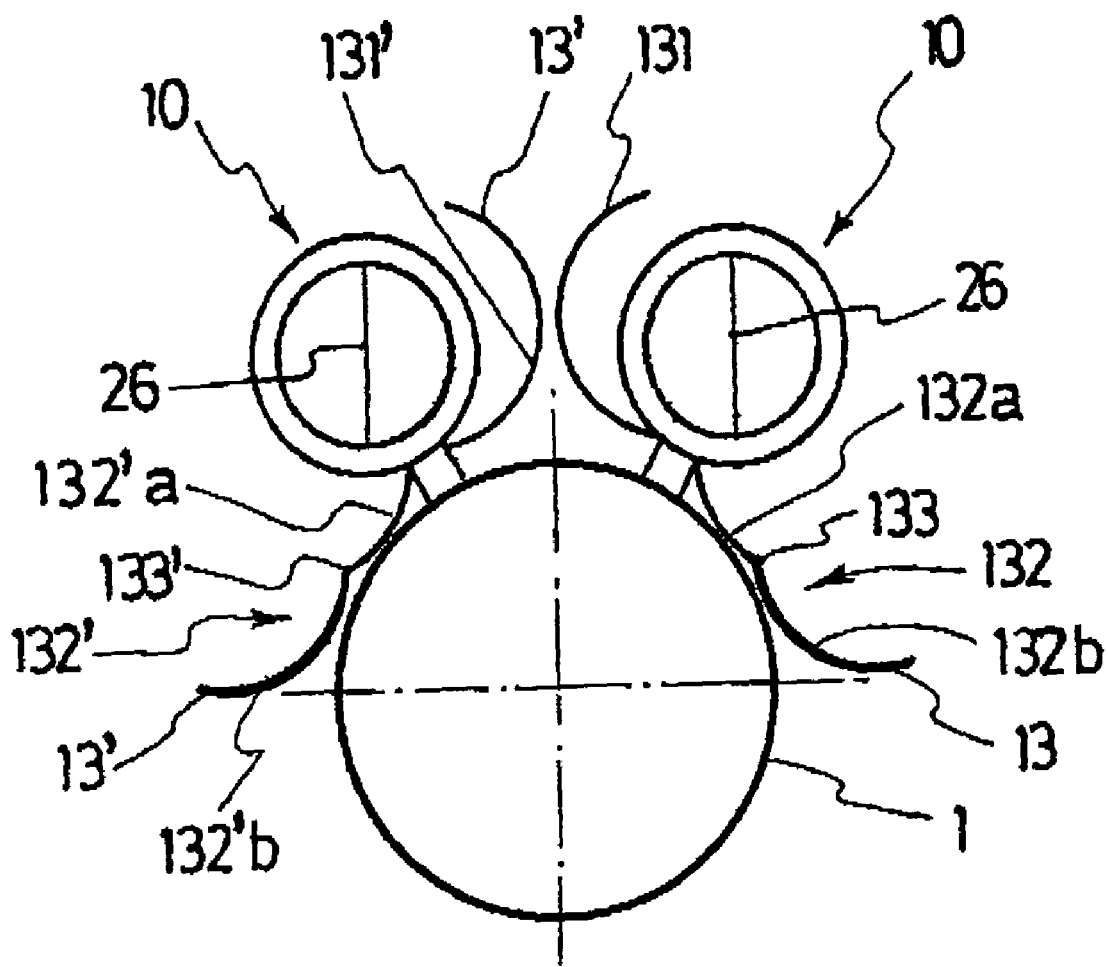
FIG. 3 shows a schematic front view of the two turbojets of FIG. 1, with the fan cowls open.

With reference to FIG. 3, when the turbojet 10 is placed at the left of the aircraft, the fan cowl 13' is arranged such that it can be opened to release access from the left of the aircraft, while when the turbojet 10 is placed at the right of the aircraft the fin cowl 13 is arranged such that it can be opened to release an access from the right of the aircraft.

Each fan cowl 13, 13' opens splitting into two parts (131, 132), (131', 132'). One part 131, 131' hinges towards the top of the turbojet 10 and the other part 132, 132' hinges towards the bottom of the turbojet 10. The part 132, 132' that hinges downwards is articulated in two parts (132$a$, 132$b$), (132'$a$, 132'$b$) about a hinge 133, 133'. In this way, the opening angle and therefore the access space to the turbojet 10 opened up by hinging of the two parts (131, 132), (131', 132') of a fan cowl 13, 13' is greater than if there were no hinge. The accessories 22, 23, 24, 25 as a whole are easily accessible regardless of the position of the turbojet.

Furthermore, once again the accessories 22, 23, 24, 25 of a turbojet 10 are located relative to the other turbojet 10 such that they cannot be reached, or are difficult to reach, if the disk of one of the rotors in the other turbojet 10 should burst.

A turbojet 10 is fixed to the fuselage 1 of the aircraft firstly at the forward casing 12, as has just been described, and secondly at the aft casing 18. For the aft casing, a coat hanger 128, 128', or fitting, fixed to the fuselage 1 by arms, is fixed to the casing 18, for example at the location of the turbine 16. At this location, the casing 18 is provided with attachments points, as before, distributed on the casing 18 symmetrically about the vertical plane 26. Consequently, the same turbojet 10 can indifferently be fixed at its aft casing 18 on either side of the fuselage 1, using ad hoc attachment points.

Two thrust transmission connecting rods (40, 41), (40', 41') are fixed to the coat hanger 128, 128' at one end, and to the turbojet 10 at the other end on the upstream side of the turbojet such that the thrust is transmitted to the aircraft through the arm 30, 30' connected to the forward casing 12, and not through the arm connected to the coat hanger 128, 128'. These thrust transmission connecting rods (40, 41), (40', 41') are well known according to prior art and will not be described in more detail.

The attachment points 31, 32, 33, 31', 32', 33' of the forward casing 12 or the attachment points of the aft casing 18 are functionally grouped into triplets (31, 32, 33), (31', 32', 33'), each triplet having the function of attaching a coat hanger 28, 28' on one side of the turbojet 10. Note that in the preferred embodiment of the turbojet of the invention, the attachment points 32, 32' located between the other two attachment points (31, 33), (31', 33') are not used directly for attachment of the coat hanger 28, 28'; these are called "waiting" attachment points, present only to overcome a failure of the other two points. These waiting attachment points 32, 32' may be eliminated and replaced by elements performing the same function, for such as for example double connecting rods.

Note that the parts 132, 132' of the cowls 13, 13' hinging downwards may possibly be articulated into more than two parts, for example three parts in order to release an even larger access space.

Finally, an anti-siphon device may be integrated into the oil tank 22, to prevent oil retention in equipment due to gravity when the engine is stopped.

What is claimed is:

1. Turbojet designed to be fixed in upper position of the aft section of the fuselage of an aircraft, using at least one coat hanger, the turbojet comprising a fan, a forward casing, an aft casing, accessories arranged around the periphery of the forward casing, the forward casing comprising attachment points, for the coat hanger, characterised in that the attachment points are arranged so as to enable that the turbojet can be mounted indifferently on either side of the aircraft fuselage, the accessories are arranged on the casing so that they are accessible from the outside of the fuselage regardless of which side the turbojet is mounted on, the attachment points, of a coat hanger to the forward casing being distributed on each side of the vertical plane containing the centreline of the turbojet and the coat hanger being designed to be fixed cantilevered from its attachment arm to the aircraft, the accessories being located close to the vertical plane and comprising at least one oil tank, a fuel control unit or a computer, placed on the upper part of the forward casing, and an accessory gearbox, placed on the lower part of the forward casing.

2. Turbojet according to claim 1, in which the attachment points, of a coat hanger to the forward casing are distributed symmetrically about the vertical plane.

3. Turbojet according to claim 1, in which the forward casing includes two attachment points, on each side of the vertical plane, and a waiting attachment point located between the other two attachment points.

4. Turbojet according to claim 1, in which the attachment points, are distributed on each side of the accessory gearbox.

5. Turbojet according to claim 1, in which the aft casing also comprises coat hanger attachment points distributed on each side of the vertical plane.

6. Turbojet according to claim 5, in which the coat hanger attachment points to the aft casing are distributed symmetrically about the vertical plane.

7. Turbojet according to claim 1, comprising a fan cowl that can be separated into two parts, one that can hinge upwards and the other that can hinge downwards to provide access to accessories on the side on which the turbojet is mounted.

8. Turbojet according to claim 7, in which the part that can hinge downwards is hinged into two parts.

9. Aircraft comprising a fuselage, two turbojets according to claim 1, fixed on each side of the fuselage in upper position using a coat hanger fixed to the forward casing and a coat hanger fixed to the aft casing.

* * * * *